UNITED STATES PATENT OFFICE.

FRANZ CARL ALKIER, OF WIESELBURG-ON-THE-ERLAUF, AUSTRIA-HUNGARY.

OBTAINING ACETIC ACID AND METHYL ALCOHOL.

SPECIFICATION forming part of Letters Patent No. 431,243, dated July 1, 1890.

Application filed March 11, 1890. Serial No. 343,542. (No specimens.)

*To all whom it may concern:*

Be it known that I, FRANZ CARL ALKIER, a subject of the Emperor of Austria, residing at Wieselburg-on-the-Erlauf, in the Province of Lower Austria, in the Empire of Austria-Hungary, have invented certain new and and useful Improvements in the Method of Extracting the Substances Dissolved in the Waste-Water of Pasteboard and Paper Machines; and I do hereby declare the following to be a full, clear, and exact description of the invention, such as will enable others skilled in the art to which it appertains to make and use the same.

The invention has for its object the recovery of the acetic acid and methyl alcohol ordinarily going to waste with the waste water or lye resulting from the washing or working of wood-pulp in the manufacture of paper, and to effect this in an economical manner.

To these ends the invention consists in the mode of treating the waste water or lye, as hereinafter more fully described.

It is not possible to remuneratively treat the waste water or lyes referred to in the condition in which they are usually allowed to run off, in order to recover therefrom the acetic acid and methyl alcohol, and I attain the object of my invention by first bringing the water or lye to a concentrated condition by using the same over and over again until sufficiently concentrated or sufficiently saturated with acetic acid and methyl alcohol to admit of the remunerative elimination therefrom of the products named. A solution containing over a given per centum of acetic acid would, however, injuriously affect the machines in which the pulp is treated, and to avoid this I neutralize the acid in the lye or water by means of an alkali, the nature of which will depend upon the nature of the chemicals used in the subsequent treatment of the concentrated lyes. In general I may state that hydrated lime or soda-ash may be employed for this purpose.

After the neutralized waste water or lye has become sufficiently concentrated for further treatment the quantity run off from the machines is replaced either by fresh water alone or by combining the concentrated water with fresh water and neutralizing the same, as described.

When a sufficient quantity of the concentrated and neutralized waste water or lye has been collected, I subject the same, first, to distillation to recover therefrom the methyl alcohol. The residuary liquid is then evaporated to dryness, in order to eliminate therefrom the alkali acetate.

When hydrate of lime has been used to neutralize the waste-water, acetate of lime will be obtained, and when soda-ash has been used acetate of soda will be obtained. The acetic acid can then be obtained from the acetate of lime by distillation with hydrochloric acid or from the acetate of soda by distillation with sulphuric acid, as is well known.

Having described my invention, what I claim, and desire to secure by Letters Patent, is—

1. The herein-described process of recovering the methyl alcohol and acetic acid from the waste wash-water or lye in the manufacture of paper from wood-pulp, which consists in concentrating such water or lye by repeated use, neutralizing the concentrated solution by means of an alkali, recovering therefrom the methyl alcohol by distillation, and evaporating the residuary liquor to dryness, whereby the acetic acid is obtained in the form of an acetate, as described.

2. The herein-described process of recovering the methyl alcohol and acetic acid from the waste wash-water or lye in the manufacture of paper from wood-pulp, which consists in concentrating such water or lye by repeated use, neutralizing the same by means of an alkali as concentration proceeds, recovering the methyl alcohol from the concentrated solution, evaporating the residuary liquid to dryness, and obtaining the acetic acid from the acetate by distillation with an acid, as described.

In testimony whereof I affix my signature in presence of two witnesses.

FRANZ CARL ALKIER.

Witnesses:
VICTOR KARNING,
SAMUEL KLATSCHKO.